(12) United States Patent
Glasschröder et al.

(10) Patent No.: US 12,365,034 B2
(45) Date of Patent: Jul. 22, 2025

(54) PRINT HEAD AND METHOD FOR STARTING UP A PRINT HEAD

(71) Applicant: GROB-WERKE GmbH & Co. KG, Mindelheim (DE)

(72) Inventors: Johannes Glasschröder, Neusäß (DE); Benjamin Himmel, Munich (DE); Andreas Lang, Ettringen (DE); Oliver Leusch, Augsburg (DE); Christian Miklec, Bad Wörishofen (DE); Martin Otter, Memmingen (DE)

(73) Assignee: GROB-WERKE GmbH & Co. KG, Mindelheim (DE)

( * ) Notice: Subject to any disclaimer, the term of this patent is extended or adjusted under 35 U.S.C. 154(b) by 30 days.

(21) Appl. No.: 18/267,506

(22) PCT Filed: Mar. 10, 2022

(86) PCT No.: PCT/EP2022/056183
§ 371 (c)(1),
(2) Date: Jun. 15, 2023

(87) PCT Pub. No.: WO2022/263023
PCT Pub. Date: Dec. 22, 2022

(65) Prior Publication Data
US 2024/0051031 A1    Feb. 15, 2024

(30) Foreign Application Priority Data
Jun. 18, 2021 (DE) .................. 10 2021 115 821

(51) Int. Cl.
| | |
|---|---|
| *B33Y 10/00* | (2015.01) |
| *B22F 10/22* | (2021.01) |
| *B22F 12/53* | (2021.01) |
| *B33Y 30/00* | (2015.01) |

(52) U.S. Cl.
CPC .............. *B22F 12/53* (2021.01); *B22F 10/22* (2021.01); *B33Y 10/00* (2014.12); *B33Y 30/00* (2014.12)

(58) Field of Classification Search
None
See application file for complete search history.

(56) References Cited

U.S. PATENT DOCUMENTS

| | | |
|---|---|---|
| 2021/0387253 A1 | 12/2021 | Schweizer et al. |
| 2022/0176451 A1 | 6/2022 | Schweizer et al. |

FOREIGN PATENT DOCUMENTS

| | | |
|---|---|---|
| DE | 10 2017 211 411 | 1/2019 |
| DE | 10 2017 211 411 A1 | 1/2019 |

(Continued)

OTHER PUBLICATIONS

International Search Report and Written Opinion.
German Search Report.

*Primary Examiner* — Yung-Sheng M Tsui
*Assistant Examiner* — Melody Tsui
(74) *Attorney, Agent, or Firm* — Hoffmann & Baron, LLP (57) ABSTRACT

A method for starting up a nozzle channel of a print head for processing liquid molten metal, the method including the following steps:
A) preparing the print head, wherein metal is melted in a crucible to form a molten metal, and a piston tip is introduced into a nozzle chamber,
B) creating an overpressure inside the crucible which encourages molten metal to enter the nozzle chamber,
C) moving the piston tip in the nozzle chamber, the piston tip being moved back and forth by an actuator at a filling frequency until molten metal is expelled from the nozzle channel,
D) moving the piston tip in the nozzle chamber, the piston tip being moved back and forth by the actuator, wherein
(Continued)

initially the movement is performed at a starting amplitude at which molten metal is expelled from the nozzle channel out of the print head, and subsequently the amplitude of the movement is gradually reduced, and wherein the movement is performed with gradual reduction of the amplitude until molten metal is no longer being expelled from the nozzle channel out of the print head, wherein the amplitude at which molten metal is barely being expelled from the nozzle channel out of the print head is defined as the limit amplitude.

15 Claims, 2 Drawing Sheets

(56) References Cited

FOREIGN PATENT DOCUMENTS

| | | |
|---|---|---|
| DE | 10 2017 221 949 | 5/2019 |
| DE | 10 2017 221 949 A1 | 5/2019 |
| DE | 10 2018 216 930 | 4/2020 |
| DE | 10 2018 216 930 A1 | 4/2020 |
| DE | 10 2018 221 752 | 6/2020 |
| DE | 10 2018 221 752 A1 | 6/2020 |
| DE | 10 2019 204 566 | 10/2020 |
| DE | 10 2019 204 566 A1 | 10/2020 |
| DE | 10 2019 219 854 | 6/2021 |
| DE | 10 2019 219 854 A1 | 6/2021 |
| WO | WO 2020/200908 | 10/2020 |
| WO | WO-2020200908 A1 * | 10/2020 |

* cited by examiner

PRINT HEAD AND METHOD FOR STARTING UP A PRINT HEAD

This application is a National Stage application based on an International Application filed under the Patent Cooperation Treaty PCT/EP2022/056183, filed Mar. 10, 2022, which claims priority to DE 102021115821.4, filed Jun. 18, 2021.

BACKGROUND OF THE INVENTION

The invention relates to a method for starting up a nozzle channel of a print head for processing liquid molten metal, the method comprising the following steps:
A) preparing the print head, wherein metal is melted in a crucible to form a molten metal, and a piston tip is introduced into a nozzle chamber,
B) creating an overpressure inside the crucible which encourages molten metal to enter the nozzle chamber,
C) moving the piston tip in the nozzle chamber, wherein the piston tip is moved back and forth by an actuator at a filling frequency until molten metal is expelled from the nozzle channel,
D) moving the piston tip in the nozzle chamber, the piston tip being moved back and forth by the actuator, wherein the movement is initially performed at a starting amplitude at which molten metal is expelled from the nozzle channel out of the print head, and subsequently the amplitude of the movement is gradually reduced, and wherein the movement is performed with gradual reduction of the amplitude until molten metal is no longer expelled from the nozzle channel out of the print head, wherein the amplitude at which molten metal is barely expelled from the nozzle channel out of the print head is defined as a limit amplitude. The invention further relates to a print head for processing liquid molten metal including a control unit designed to carry out the method according to the invention.

Additive manufacturing methods are manufacturing methods in which components are built up step by step by sequentially adding small amounts of material. An advantage of such additive manufacturing methods is that no or only extremely low expenditures are incurred for manufacturing production tools for producing the components. Moreover, the generation of larger amounts of waste or scrap in forming a component as encountered, for example, in metal-cutting manufacturing methods is avoided in additive manufacturing methods. Furthermore, complex shapes such as, for example, undercuts can be produced in a single operation in additive manufacturing which is not possible in other methods of primary shaping, reshaping, or cutting. Additive manufacturing methods are therefore particularly suitable for the fast and cost-effective production of prototypes and small series parts. For components made of plastic, additive manufacturing methods have been known for quite some time, for example in the form of 3D printing methods in which three-dimensional, physical components are produced based on a virtual data model.

In the meantime, it is also possible to process metal materials in additive manufacturing methods and to thereby produce three-dimensional metal components. Metal components may be produced by means of a beam source, for example a laser, for example, in a bed of metal powder. The metal powder is locally melted by the beam source and joined to form a solid body. Such methods are known, for example, under the name of "Laser Powder Bed Fusion (LPBF)". Likewise, methods known as "Direct Energy Deposition (DED)" are suitable for producing three-dimensional metal components.

Moreover, methods called "Material Jetting MJT" are known in which liquid molten metal in the form of drops is three-dimensionally fused to form metal components. Systems provided with this complex technology are still hardly available in the market. Currently, work on the further development towards series maturity of such methods is in progress. In these methods, print heads are used which discharge liquid metal in the form of drops and thereby successively produce a metal component in layers. A critical component of such print heads is the nozzle through which the liquid metal drops are discharged. In a such a nozzle, liquid metal is to be prevented from adhering to and unintentionally changing or closing the outlet area of the nozzle. Such a change of the nozzle would result in a non-reproducible behaviour in the discharge of drops and therefore in a non-reproducible printing result which is not desired in manufacturing. For this reason, nozzles having metallophobic, i.e., metal-repellent surfaces have been developed to prevent adhesion and to encourage drop separation. However, if the inner surface of the nozzle channel through which the liquid metal exits the nozzle is also designed to be metallophobic frequently no reproducible wetting by the liquid metal will be achieved there so that, in turn, the drop expulsion is not reproducible.

This conflict of objectives can be solved, for example, by part the nozzle being designed to be metallophobic, and another part, particularly the inside of the nozzle channel, being designed to be metallophilic. Such an, in sections, different design of the surfaces of the nozzle is described, for example, in DE 10 2018 221 752 A1. A disadvantage of this solution is that, at least in a subsection of the nozzle, additionally, a coating has to be applied in a locally confined manner. This additional coating is intricate and increases the costs of the nozzle which, as a wearing element, needs to be replaced in regular intervals.

Moreover, for improving the wetting of the inside of the nozzle channel, a method for starting up a nozzle is known in which high-frequency vibrations are coupled into the liquid metal to remove air bubbles from the molten metal. If air bubbles are contained in the molten metal in the nozzle channel or in the nozzle chamber these will have the effect of air springs upon pressure and impede the targeted and reproducible expulsion of drops. Such a solution is disclosed, for example, in WO 2020/200908 A1. A drawback of this starting up method is that, while wetting inside the nozzle channel or the nozzle chamber is effectively improved by removing the air bubbles, it is nevertheless hard to determine whether and when complete wetting has taken place in the nozzle channel. In spite of the implementation of the known starting up method, it is therefore not ensured that the nozzle will then expel drops of the liquid metal in good quality and in a reproducible fashion.

SUMMARY OF THE INVENTION

Therefore, it is the object of the invention to propose solutions with the aid of which a metallophobic nozzle channel of a print head for processing liquid molten metal can be more readily prepared for its use for the high-quality, reproducible expulsion of metal drops.

This object is solved by a method for starting up a nozzle channel of a print head for processing liquid molten metal, the print head comprising the following components:
a crucible for accommodating a metal to be printed,
a heating device for melting the metal, a nozzle connected to the crucible and including a nozzle chamber and a nozzle channel extending along an expulsion direction, the nozzle chamber and the nozzle channel merging into each other, an actuator including a piston having a piston tip introducible into the nozzle chamber, the actuator being configured to linearly move the piston back and forth, particularly in a direction parallel to the expulsion direction, the method comprising the following steps:

A) preparing the print head, wherein metal is melted in the crucible to form a molten metal, and the piston tip is introduced into the nozzle chamber, wherein, in the introduced state, there is a distance, at least in sections, between the piston tip and the nozzle chamber in the radial direction to the expulsion direction, B) creating an overpressure inside the crucible which encourages molten metal to enter the nozzle chamber, C) moving the piston tip in the nozzle chamber, wherein the piston tip is moved back and forth by the actuator at a filling frequency which is larger than or equal to 1 kHz until molten metal is expelled from the nozzle channel out of the print head, D) moving the piston tip in the nozzle chamber, wherein the piston tip is moved back and forth by the actuator, wherein initially the movement is performed at a starting amplitude at which molten metal is expelled from the nozzle channel out of the print head, and subsequently the amplitude of the movement is gradually reduced, and wherein the movement is performed with gradual reduction of the amplitude until molten metal is no longer expelled from the nozzle channel out of the print head, wherein the amplitude at which molten metal is barely expelled from the nozzle channel out of the print head is defined as a limit amplitude, E) repeating process step D) n times in succession, wherein, in each of the n repetitions of process step D), the limit amplitude is determined in process step D), F) concluding the method for starting up a nozzle channel as soon as the determined limit amplitudes are all equal to or smaller than a defined limit amplitude in n+1 repetitions of process step D).

The method according to the invention is performed to start up a nozzle channel of a print head. Preferably, the method according to the invention is initially performed once to start up a nozzle channel not previously wetted. Alternatively, it is possible to also use the method according to the invention for a nozzle channel which was already in operation in case of malfunctions during additive manufacturing. Preferably, the method according to the invention is performed in the indicated chronological order of process steps A) to F). However, the order of the implementation of the process steps may, at least partly, also be exchanged or changed.

First, the components or elements of a print head started up with the aid of the method according to the invention will be described. The print head comprises a crucible accommodating the metal to be printed in the additive production. The crucible is designed to be heat-resistant so that it can sustainably accommodate even liquid molten metal having a high temperature. A heating device provided for melting the metal or for at least maintaining a molten state is provided adjacent to or connected to the crucible. The heating device may be implemented, for example, as a resistance heater or as an induction heater. The print head further comprises a nozzle connected to the crucible. The nozzle is an assembly from which the liquid molten metal is expelled during the additive production. The nozzle may be partly formed by sections of the crucible or be provided as a separate assembly installed in the crucible. The expulsion direction is defined as the direction in which liquid molten metal is expelled in the operation of the print head. The nozzle includes a nozzle chamber and, adjacent to the nozzle chamber, at least one nozzle channel. Both the nozzle chamber and the nozzle channel extend along the expulsion direction. The nozzle chamber is disposed on the side of the nozzle facing the interior of the crucible, the nozzle channel is disposed on the side of the nozzle chamber facing away from the interior of the crucible and constitutes a discharge area for molten metal from the nozzle. The nozzle chamber and the nozzle channel merge into each other and are fluidically connected to each other. The inner cross-section perpendicular to the expulsion direction of the nozzle chamber is larger than the corresponding inner cross-section of the nozzle channel. The print head further comprises an actuator constituting the assembly inducing the expulsion of liquid molten metal from the nozzle by converting energy. The actuator is connected to a piston. The moving direction of the actuator and the longitudinal axis of the piston extend in the direction of or parallel to the expulsion direction. The piston has a piston tip introducible into the nozzle chamber on its side located opposite of the connection to the actuator. The actuator is a linear actuator; that means that it is provided to linearly move the piston back and forth.

The method according to the invention comprises following steps: In a first process step A), the print head is prepared. For this purpose, the metal to be printed is melted inside the crucible to form a melt. To this end, metal introduced into the crucible as a solid can be melted in the crucible by the heating device. Alternatively, at least part of the molten metal may also be supplied to the crucible from the outside in an already liquid state. The crucible may also first be heated by the heating device before metal is introduced into the crucible. As soon as liquid molten metal is present in the crucible, part of the molten metal will already flow to the connection of the interior of the crucible to the nozzle chamber. Preferably, the nozzle chamber is connected to its interior in a lower section of the crucible so that the molten metal is moved to and also, locally, into the nozzle chamber by the force of gravity. Preferably, the piston tip of the piston is introduced into the nozzle chamber after liquid molten metal is already present in the crucible. This initial introduction of the piston tip encourages the entry of the molten metal into the nozzle chamber by the piston tip drawing liquid molten metal with it. However, the piston tip may alternatively also be introduced into the nozzle chamber prior to the introduction of metal into the crucible. In a state in which the piston tip is introduced into the nozzle chamber, there is, at least in sections, a distance between the inner wall of the nozzle chamber and the outer surface of the piston tip. This distance may extend, for example, in a direction radial to the expulsion direction. This distance ensures that liquid molten metal can move past the piston tip into the nozzle chamber and in the direction of the nozzle channel. This subsequent guiding of liquid molten metal in the direction of the nozzle channel is important to achieve a complete filling of the interior of the nozzle chamber and of the nozzle channel.

In a second process step B), an overpressure is generated inside the crucible. This overpressure encourages the further entry of the liquid molten metal into the nozzle chamber and the nozzle channel. Since the surfaces of the nozzle chamber and the nozzle channel are metallophobic the surface tension of the molten metal has to be overcome for inducing a wetting of these surfaces which, at least partly, takes place by means of a driving overpressure inside the crucible. The level of the overpressure depends on the geometric structure of the crucible and the nozzle. It is also feasible to establish an extremely low or no overpressure at all if an entry of the liquid molten metal into the nozzle driven by the force of gravity is already given to a sufficient extent.

In a third process step C), the piston tip is moved back and forth in the nozzle chamber at a filling frequency. The filling frequency is significantly higher than the frequency at which liquid molten metal is discharged in the form of drops in the operation of the print head. The filling frequency is preferably higher than 1 kHz and may amount to, for example, 4 kHz. However, even higher filling frequencies of, for example, more than 20 kHz may be used. The back and forth movement of the piston tip is induced by the actuator which is driven accordingly. Here, the amplitude of the piston tip in process step C) is preferably larger than the starting amplitude in process step D) which is described further below. The amplitude of the piston tip in process step C) is preferably also larger than the amplitude at which the piston tip is moved in an operating mode in which the print head expels molten metal in drops to form a component. In this operating mode, the amplitude of the piston tip may be larger than the starting amplitude in process step D).

The high-frequency movement of the piston tip inside the nozzle channel induces vibrations in the liquid molten metal which in turn results in the disintegration of air bubbles present in the molten metal or in the boundary zone between the molten metal and the wall of the nozzle channel. If air bubbles are present in the molten metal these act like air springs and suppress the transfer of energy between the piston tip and the molten metal in the operation of the print head. For this reason, air bubbles in the molten metal result in non-reproducible printing results and, in addition, impede the initial wetting of the nozzle chamber and the nozzle channel. By inducing a vibration in the molten metal by means of the piston tip the air bubbles dissolve which in turn results in an improved energy transfer between the piston tip and the molten metal. In this way, the molten metal is successively moved into the interior of the nozzle chamber and also of the nozzle channel which results in an at least local wetting of the metallophobic surfaces. Therefore, the high-frequency movement of the piston tip results in the achievement that liquid molten metal is moved through the entire nozzle channel and expelled from the print head as early as in process step C). In process step C), the case may arise that the nozzle chamber and/or the nozzle channel are not yet completely filled with molten metal and that, nonetheless, liquid molten metal is expelled when the piston tip is moving. In this case, for example, only a section of the nozzle channel facing the nozzle chamber may be filled with melt. The melt will then form a meniscus spanning the cross-section of the nozzle channel in the boundary zone between the filled section and the section of the nozzle channel which is not yet filled. In process step C), therefore, it cannot yet be reliably determined whether the entire inner surface of the nozzle channel is actually wetted and whether a discharge of drops is already reproducible.

In a fourth process step D) which is started after an expulsion of liquid molten metal in process step C), the piston tip is moved in the nozzle chamber at a decreasing amplitude. In process step D) as well, the linear back and forth movement of the piston tip by the actuator driven accordingly will take place. In process step D), the piston tip is initially moved at a starting amplitude. Here, the amplitude may also be understood to be the length of the stroke of the piston tip. Ultimately, the amplitude of the piston tip results in a reduction of the volume available for the molten metal in the nozzle chamber. The amplitude of the piston tip is therefore directly proportional to the change of the volume of the liquid molten metal in the nozzle chamber. The starting amplitude is selected so that it is large enough to achieve a reliable expulsion of molten metal from the nozzle. The starting amplitude is the maximum amplitude during the implementation of the method according to the invention. Preferably, the actuator is designed so that it is capable of generating even larger amplitudes than the starting amplitude. The starting amplitude is therefore preferably smaller than the maximum amplitude generatable by the actuator. For example, the magnitude of the selected starting amplitude may be empirically determined in preceding experiments. In process step D), the piston tip is preferably accelerated at a significantly higher rate than in the operating mode for producing components, at least in case of a movement at the starting amplitude. In the following course of process step D), the amplitude of the piston tip is gradually reduced. For each reduction, it will be assessed whether or not molten metal is expelled from the nozzle channel. For this assessment of whether molten metal is expelled, an associated technical expulsion detection device may be provided on or close to the print head. The reduction of the amplitude of the piston tip and the verification of the expulsion of molten metal for each of the amplitudes are continued until an expulsion of molten metal from the nozzle can no longer be detected at a set amplitude. The amplitude at which molten metal is barely expelled is defined as the limit amplitude. Preferably, this limit amplitude is the amplitude which was set prior to the step in which molten metal is no longer expelled.

In a fifth process step E), a repetition of the previously performed process step D) takes place. Process step D) is performed again, the piston tip again first being moved at the starting amplitude, and the amplitude then being again reduced until an expulsion of molten metal from the nozzle will no longer take place. For the repetition as well, the limit amplitude is determined as previously described. The limit amplitude determined for the repetition is then compared to the limit amplitude determined the first time and/or with the limit amplitudes determined for previous repetitions. The comparison of the limit amplitudes allows for a conclusion about the degree of wetting of the inner surfaces of the nozzle channel. If there is significant difference between the determined limit amplitudes it can be assumed that the nozzle channel, in sections, has not yet been wetted by the molten metal. Conversely, in case of limit amplitudes which exhibit a low variance and are close to each other, it can be assumed that a complete wetting of the interior of the nozzle channel has already taken place and that it is ready for a reproducible production of components. The repetition of process step D) is performed n times. In case of a new or yet little studied type of nozzle, n is preferably selected in the range of 1 to 5 to obtain a high reliability with regard to the assessment of the wetting. In cases in which technical problems arise, n may also be selected to be larger than 5. For a nozzle type or a type of a nozzle channel which has already been well studied and for which already a plurality of determined limit amplitudes exists, n may also be selected to be zero, and therefore, the complete process step E) may be omitted. In this case, it can be predicated with sufficient certainty that a complete wetting of the nozzle channel has already taken place based on the magnitude of the determined limit amplitude after having completed process step D) just once. However, n is preferably selected to be at least equal to 1, and process step E) is performed at least once to be capable of comparing at least two determined limit amplitudes to each other.

The method according to the invention is concluded in a sixth process step F) as soon as all determined limit amplitudes from the preceding process steps D) and E) are equal to or smaller than a defined limit amplitude. This defined limit amplitude is to be understood to be a threshold empirically determined in advance which represents an amplitude at which an expulsion of molten metal from the nozzle has to take place when the nozzle channel is completely wetted. If a limit amplitude determined by means of the starting up method is larger than this defined limit amplitude this means that the wetting of the nozzle channel is presumably insufficient. In this case, the starting up method according to the invention is continued to drive molten metal into the nozzle channel with the aid of higher amplitudes and accelerations than in the production of components by repeatedly performing process step D) and to induce further wetting in this way. The actual completion of the method may be made conditional on various criteria. For example, such a criterion may be that the determined limit amplitudes have to be smaller than or equal to the defined limit amplitude n+1 times in succession. This criterion is not satisfied, for example, if the determined limit amplitude is smaller than the defined limit amplitude twice and larger a third time. In this case, the method has to be continued with repetitions of process step E) until all n+1 successive repetitions are smaller than or equal to the defined limit amplitude. Alternative or additional criteria for the completion of the method may also be based on, for example, the determination of a variation in the limit amplitudes, the determined variation being compared to a permissible maximum variation.

The method for starting up the nozzle channel of a print head according to the invention can be implemented in a simple fashion since the same components and control elements are used for carrying out the method as for producing components by means of the print head. With the method according to the invention, an economically produced, completely metallophobic nozzle channel can be prepared for the operation for the production of components so that a high-quality, reproducible expulsion of liquid molten metal from the print head is possible. Moreover, the starting up method according to the invention is, in a simple fashion, adaptable to the level of development of and to the existing expertise on a nozzle channel. The method can be varied and adapted with little effort by varying the number n of the repetitions of process step D). After having carried out the starting up method according to the invention, a series production of components can be reproducibly performed using the then completely wetted nozzle channel. In addition, the series production is cost-effective since simple replacement parts, particularly replacement parts including the nozzle channel, can be used. Moreover, the method according to the invention can, in a simple fashion, also be performed in an automatized manner. A control unit or control may be provided which automatically performs the process steps and saves and statistically analyses the determined values, particularly the limit amplitudes. In this way, the results of the method according to the invention can also be archived and documented in a procedurally reliable way. Furthermore, the method according to the invention can also be adapted to other designs of a print head in a simple manner. The principle of the method according to the invention can analogously also be applied to larger or smaller print heads and is therefore useful in the new development of various additively operating production systems.

In one embodiment, it is contemplated that, between process steps B) and C), the piston tip is moved back and forth inside the nozzle chamber in a process step B1), the amplitude of this movement being larger than the starting amplitude by at least the factor of 10. In this embodiment, the method comprises an additional process step which contributes to wetting the inner surface of the nozzle chamber and of the nozzle channel. In this additional process step B1), the piston tip is moved back and forth in the nozzle chamber at an amplitude which is significantly larger than the starting amplitude and the amplitude at which the piston tip is moved during the production of components in the operation of the print head. For example, the piston tip is moved parallel to the expulsion direction by at least one third of the length the nozzle chamber in process step B1). It is also possible to move the piston tip by half or more than half of the length of the nozzle chamber. It is likewise possible to completely withdraw the piston tip from the nozzle chamber and to then reintroduce it into the nozzle chamber. The amplitude at which the piston tip is moved in process step B1) may be, for example, 15 mm. With this movement of the piston tip at a large amplitude, molten metal is moved into the nozzle chamber and in the direction of the nozzle channel. With its movement, the piston tip will draw liquid molten metal with it which is pushed against the inner wall of the nozzle chamber during the movement. In process step B1), the piston tip is preferably moved into the nozzle chamber at a higher speed and pulled out of the nozzle chamber again at a lower speed. An appropriate speed for the movement of the piston tip into the nozzle chamber is, for example, 15 mm/s. An appropriate speed for pulling the piston tip out of the nozzle chamber is, for example, 5 mm/s. Owing to the higher speed during the movement of the piston tip into the nozzle chamber, liquid molten metal is pressed into the nozzle chamber and the nozzle channel, since, due to the higher speed, the melt can only escape through the distance between the piston tip and the nozzle chamber to a limited extent. While being withdrawn, the piston tip is moved at a low speed to prevent the piston tip from extracting a significant amount of liquid molten metal from the nozzle chamber again which wound counteract a good wetting of the nozzle chamber and the nozzle channel. At the lower speed during the withdrawal, melt present above the piston tip can flow past through the distance between piston tip and nozzle chamber wall and is not drawn out of the nozzle chamber. In this way, the wetting of the inner wall of the nozzle chamber is encouraged. In addition, the piston tip, while moving in the direction of the nozzle channel, pushes liquid molten metal into the nozzle channel which encourages its wetting. Preferably, at least a section of the piston tip will always remain inside the nozzle chamber in process step B1). The piston tip is not completely withdrawn from the nozzle chamber since, in case of such a complete withdrawal, molten metal having already entered the nozzle channel could be displaced by taken in air entering through the expulsion opening of the nozzle channel facing away from the nozzle chamber to compensate for the empty volume produced during a withdrawal of the piston tip from the nozzle chamber. Preferably, the amplitude of the piston tip is considerably larger than the starting amplitude in process step B1). Therefore, it is also possible that the amplitude is larger than the starting amplitude by a factor of 100 or 1000 in process step B). For moving the piston tip at such a large amplitude, in addition to the actuator, a further moving device moving the piston tip at such a large amplitude may be provided.

Moreover, it is advantageously contemplated that, in a case in which, after a predetermined dwell time, no molten metal is expelled in process step C), process step B1) according to the previously described embodiment is repeated. In this embodiment, a repetition of the previously described process step B1) is provided for if, in process step C), no expulsion of liquid molten metal from the nozzle channel is achieved. It may occur that, due to the high-frequency movement of the piston tip in the nozzle chamber in process step C) which is performed at a considerably smaller amplitude than the slower back and forth movement in process step B1), no expulsion of molten metal will take place. This may happen, for example, if extremely little molten metal was transported into the nozzle channel at this point in time. In this case, process step B1) is repeated to convey a larger amount of liquid molten metal into the nozzle channel. For subsequently delivering a larger amount of material, a slow movement of the piston tip at a large amplitude in process step B1) is more suitable than the high-frequency movement at a lower amplitude in process step C). In another, alternative embodiment of the method, process step B1) may also be omitted in a first cycle, and process steps B) and C) can be performed in direct succession. If, in this case, then no molten metal is expelled in process step C), process step B1) is performed for the first time following process step C) to convey a larger amount of molten metal into the nozzle channel and the nozzle chamber. A repetition cycle of process steps B1) and C) is repeated until molten metal is expelled from the nozzle channel in process step C).

In a further embodiment, it is contemplated that, in-between process steps C) and D), a process step C1) is performed in which the overpressure inside the crucible is reduced. In process step B), an overpressure is generated inside the crucible which encourages an entry of molten metal driven by this overpressure into the nozzle channel. This overpressure generated in process step B) may be reduced prior to the start of process step C). This reduction of the overpressure may be performed so that the pressure in the crucible is set as it is set in the operation of the print head for producing components. With such a reduction of the overpressure in the crucible, the applicability of the limit amplitude determined in process step D) to the operation of the print head for producing components is improved, and its informative value increases.

Advantageously, it is contemplated that, in process step E), the n repetitions of process step D) are performed at the overpressure inside the crucible which was reduced after process step C1). In this embodiment, the n repetitions in process step E) are also performed at an overpressure inside the crucible which is reduced as compared to process step B). In this embodiment, owing to the overpressure reduced after process step C1), process step E) is performed under pressure conditions inside the crucible which substantially correspond to the pressure conditions during the production of components by means of the print head. The determined limit amplitudes therefore allow for a direct conclusion on the limit amplitudes in the normal printing operation. Therefore, the method provides for particularly relevant, reproducible results with regard to the limit amplitudes in this embodiment.

In an advantageous implementation, it is contemplated that, in a case in which, in process step D), no molten metal is expelled from the nozzle channel out of the print head during a movement of the piston tip, a process step C2) is performed, process step C2) corresponding to process step C) which is performed at a reduced overpressure inside the crucible according to process step C1), and that process step D) is repeated after process step C2). It may occur that, during the starting up method, in process step D), no expulsion of molten metal from the nozzle channel takes place at a set starting amplitude. The reason for this may be, for example, an insufficient filling of the nozzle channel with liquid molten metal prior to the start of process step D). In this case, it is possible to increase the starting amplitude until an expulsion of molten metal takes place. However, the starting amplitude is selected so that, in case of a sufficient filling of the nozzle chamber and of the nozzle channel with molten metal, an expulsion of molten metal should take place. Another cause for no material being expelled at the starting amplitude in process step D) may be the presence of air bubbles not removed in the preceding process step C) in the molten metal. For this reason, an additional process step C2) is performed in which the piston tip is moved at a high frequency like in process step C) to remove air bubbles potentially remaining in the melt by means of vibrations in a case in which no molten metal is expelled at a previously determined starting amplitude in process step D). However, process step C2) is preferably performed at an overpressure in the crucible which is reduced as compared to process step B) here. Following the implementation of process step C2) which is completed as soon as molten metal is expelled from the nozzle channel, then, process step D) is performed again. This cycle may also be repeated until molten metal is discharged when the piston tip is moving at the starting amplitude in process step D).

Moreover, it is contemplated that the movement of the piston tip in process step D) is performed at a starting up frequency which is 10% of the minimum filling frequency of process step C) at maximum. In this embodiment, the movement of the piston tip in process step D) is significantly slower than the movement of the piston tip in process step C). In process step C), the piston tip is intentionally moved at a high frequency to dissolve air bubbles in the molten metal. In process step C) as well, molten metal is expelled from the nozzle channel by the high-frequency movement. This expulsion takes place in small drops which have irregular trajectories and do not exclusively move along the expulsion direction. Such an expulsion of smaller drops of molten metal in various flight directions is referred to as "spray". The various flight directions of the small drops occur when the inner wall of the nozzle channel is not yet completely wetted and/or the nozzle channel is not yet completely filled with molten metal. A disadvantage of the occurrence of spray is that some of the drops may contaminate parts of the nozzle by a trajectory other than the expulsion direction which in turn may result in non-reproducible printing results later. For avoiding the emergence of undesired spray in process step D), a starting up frequency is selected which amounts to 10% of the filling frequency at maximum. Even at frequencies of the piston tip which are located in-between the filling frequency in process step C) and the starting up frequency, for example at 50% of the filling frequency, drops not moving along the expulsion direction can be expelled which should also be prevented. A starting up frequency of 10% of the filling frequency at maximum has been found to be suitable for only expelling drops moving along the expulsion direction. For example, the starting up frequency may be in the order of magnitude of 10 Hz. At such low frequencies, no vibrations are coupled into the liquid molten metal, and the expulsion of drops takes place in the expulsion direction in a substantially organised manner. In addition, an undesired contamination of the nozzle or of the print head during the starting up method is prevented by the low starting up frequency. The expulsion of drops not linearly moving along the expulsion direction may also occur in process step D) or in the operating mode when the piston tip is moved at a frequency which is larger than 10% of the filling frequency, and the nozzle channel is already completely filled with and wetted by molten metal. After a movement of the piston tip for expelling molten metal, the meniscus confining the expulsion opening of the nozzle channel towards the outside on the side facing away from the nozzle chamber keeps vibrating for some time. If a further movement of the piston tip is carried out in this state in which the meniscus is still vibrating due to the preceding drop expulsion the next drop expulsion may take place in an unpredictable direction due to the vibrating meniscus. An insufficient time interval between two amplitudes or, in other words, excessively high frequencies during the movement of the piston tip should therefore also be avoided at the end of process step D) and in the operating mode to obtain a reproducible expulsion direction of the drops. The following movement or amplitude of the piston tip should only be initiated when the meniscus is no longer vibrating due to the preceding movement or amplitude. For how long the meniscus keeps vibrating may depend on the magnitude of the amplitude, the geometry of the nozzle channel, the viscosity of the molten metal, and/or other factors.

In another embodiment, it is contemplated that, in process step D), during the gradual reduction of the amplitude of the movement of the piston tip, the starting amplitude is started with, and then the amplitude is progressively reduced by a difference amplitude, the movement of the piston tip being continued for a period of time or for a number of movements after each subtraction of the difference amplitude from the current amplitude before the amplitude is once again reduced by the difference amplitude, it being determined whether molten metal is expelled from the nozzle channel out of the print head during the period of time or during the number of movements at a constant amplitude. In this embodiment, progressively, a difference amplitude is respectively subtracted from the currently set amplitude starting from the starting amplitude in process step D). After each subtraction of this difference amplitude, it will be assessed whether or not molten metal is expelled from the nozzle channel. If molten metal is expelled the current amplitude is once again reduced by the difference amplitude. This process is performed until no expulsion of molten metal from the nozzle takes place any longer. After each subtraction of the difference amplitude, the piston tip is moved at a constant amplitude for a specific number of movements or for a specific period of time to be capable of reliably determining whether or not molten metal is expelled. The number of the movements of the piston tip at a constant amplitude, or the period of time during which this movement is performed substantially depend on the way in which it is determined whether molten metal is expelled. Only after having reliably determined whether molten metal is discharged the amplitude is reduced by the difference amplitude in a further step. It is possible to select a constant difference amplitude and to thereby reduce the amplitude in constant steps. Alternatively, the difference amplitude may also be selected so that it varies in the successively performed steps of reducing the amplitude. For example, the difference amplitude may be selected so that it is larger at the start of process step D) than in the subsequent course of process step D) in which the present amplitude approaches a limit amplitude to be expected. In this way, the time for the precise determination of a limit amplitude can be reduced. Alternatively, process step D) may also be manually performed, the operator of the print head individually adjusting the magnitude of the difference amplitude for each step. In a similar manner, the number of movements of the piston tip or the period of time during which the piston tip is moved at a constant amplitude can be selected to always be equally large, or alternatively, different in magnitude. Thus, the period of time for the movement of the piston tip at a constant amplitude can be selected to be shorter at the start of process step D) since, at larger amplitudes, it can be determined more rapidly and more reliably whether molten metal is discharged. During an approximation to a limit amplitude to be expected, the period of time may then be increased to improve the accuracy of the detection of the discharge of molten metal from the nozzle channel.

Moreover, it is advantageously contemplated that the piston tip is accelerated to a higher extent than in process step D) and/or than in an operating mode in which the print head expels molten metal in drops to form a component during its back and forth movement in process step C). In this embodiment of the method, the piston tip is accelerated by the actuator at a higher rate in process step C) than in process step D). With this increased acceleration, the higher filling frequency can be achieved in process step C) which is favourable for removing air bubbles from the molten metal. Moreover, the high acceleration in process step C) encourages an entry of liquid molten metal into the nozzle channel. In process step D), the acceleration of the piston tip is accordingly reduced so that a controlled expulsion of liquid molten metal from the nozzle channel is achieved. The reduced acceleration in process step D) also serves to avoid the occurrence of spray which is undesired in process step D) since it impedes the detection of the discharge of molten metal. In addition, the acceleration in process step C) is higher than the acceleration in the operating mode of the print head in which it expels molten metal in drops to form a component.

It is possible that, during its back and forth movement in process step D), the piston tip is accelerated at a higher rate than in an operating mode in which the print head expels molten metal in drops to form a component. The acceleration of the piston tip in process step D) may be selected to be higher than the acceleration of the piston tip in the operating mode of the print head for producing a component. A higher acceleration in the starting up method encourages the wetting of the entire surface of the nozzle channel with molten metal. The acceleration of the piston tip in process step D) may be higher than the acceleration in the operating mode by, for example, at least a factor of 5, preferably by at least a factor of 10. Furthermore, it is possible to move the piston tip at the same acceleration as in the operating mode in process step D). This is advantageous in that, in process step D), the same operating parameters are used as in the operating mode which benefits an applicability of the determined limit amplitude. Finally, it is also possible to select an acceleration which is higher than the acceleration in the operating mode at the start of process step D), particularly when using the starting amplitude, to first encourage a wetting of the nozzle channel. In the further course of process step D), the acceleration can then be reduced to a value which corresponds to the acceleration of the piston tip in the operating mode, particularly when approaching the limit amplitude. This variable acceleration advantageously renders a good wetting of the nozzle channel at the start of process step D) possible and, at the same time, yields conclusive results for the determined limit amplitude at the end of process step D).

Moreover, it is contemplated that, after the completion of process step F), the print head is transferred into an operating mode in which the print head expels molten metal in drops to form a component, this expulsion of molten metal in drops taking place at a standard frequency and/or at an amplitude which is larger than the limit amplitude. After the completion of the method for starting up the nozzle channel, the print head is transferred into an operating mode in which it forms components. In the operating mode, the piston tip is moved back and forth in the nozzle chamber by the actuator so that drops of liquid molten metal are expelled from the nozzle channel in the expulsion direction. In the operating mode, the piston tip is moved at a standard frequency. Typically, the standard frequency is in a range of 100 Hz to 1 kHz. In the operating mode, the piston tip is moved at an amplitude which is equal to or larger than the limit amplitude. The limit amplitude is the amplitude at which, in the starting up method, it was determined that an expulsion of drops barely takes place. Preferably, the amplitude is selected to be larger than the limit amplitude in the operating mode to obtain a certain degree of certainty that an expulsion of molten metal in the form of drops from the nozzle channel will always take place in the operating mode. For determining the amplitude in the operating mode, for example, statistic calculations based on the determined limit amplitudes and the number n of repetitions in process steps D) and E) may be used. In this way, an amplitude can be calculated for the operating mode which renders a reproducible and high-quality expulsion of molten metal for producing a component possible at a high statistic certainty. With an increase of the amplitude in the operating mode, also the diameter of the expelled drop of molten metal can be increased. However, the drop diameter plays a minor role during the start-up of the nozzle channel.

In a preferred implementation, it is contemplated that the method is performed in an at least partly automated manner, a control unit controlling the process steps, and the completion of the method being determined by the control unit, and an associated notification being output to the operator of the control unit. In this embodiment, a control unit is provided which performs at least part of the method in an automated manner. In the process, the actuator is automatically controlled by the control unit which controls its amplitude, acceleration, and frequency. Moreover, the limit amplitude is determined, saved and analysed by the control unit in an automated manner. The completion of the method for starting up the nozzle channel is also determined by the control unit. Owing to this automation, the method can be carried out in a particularly reproducible manner, and data are saved which can be used as evidence for a correctly implemented starting up method. Of course, the method may also, at least partly, be manually performed, the difference amplitude, for example, being manually input through an interface in process step D).

In a further embodiment, it is contemplated that the amplitude of the movement of the piston tip in process steps C) and D) as well as in the operating mode in which the print head expels molten metal in drops to form a component is generated by a work amount provided by the control unit and acting in the actuator, a work receiving element being provided which is designed to receive a partial amount of work, and the work receiving element receiving part of the work amount provided by the control unit in the operating mode, only the remaining part of the work amount being converted by the actuator in the operating mode which results in an amplitude and/or an acceleration of the piston tip reduced as compared to the conversion of the full work amount. The amplitude of the piston tip depends on a work amount which is converted by the actuator. This work amount is provided by the control unit. The larger the work amount is, the larger is the amplitude of the piston tip. In the starting up method, particularly in process steps C) and D), the piston tip is preferably moved at a larger amplitude and/or at a higher acceleration than in the operating mode. It is also possible that the work amount is equally large in the starting up method and in the operating mode. Furthermore, it is possible that the amplitude of the piston tip is larger in the operating mode than in the starting up method, for example, when drops having a particularly large volume are to be expelled from the print head in the operating mode. In most cases, however, the work amount is larger in the starting up method to effectively drive the liquid molten metal into the nozzle channel and to achieve a complete wetting. To this end, preferably, the acceleration of the piston tip is also higher in the starting up method, the acceleration correlating to the change of the work amount transferred to the actuator over time. Both in the starting up method and in the operating mode, the control unit has to be designed so that it precisely controls the output work amount and therefore the controlled amplitude of the piston tip. Since the work amount may vary as previously described this places high requirements on the output of the work amount of the control unit. In this embodiment, therefore, a work receiving element is provided which receives part the work amount output by the control unit in the operating mode in which the required work amount is usually lower. This results in that the control unit always outputs a work amount in the same order of magnitude. In this way, the control unit can be designed to be particularly precise in the range of this order of magnitude. In other orders of magnitude of work amounts, the control unit may operate less precisely which reduces the requirements on the control unit and therefore also renders it more cost-effective. In the operating mode, part of the work amount will then always flow into the work receiving element which can be connected in parallel to the actuator. With such a parallel connection, the amplitude of the piston tip can be reduced in the operating mode even though a work amount in the same order of magnitude as in the starting up method is output by the control unit. For example, if the actuator is implemented as a piezo element the work amount is constituted by a charge amount. In this case, a work receiving element can be formed by an electric capacitor connected in parallel to the actuator. The provision of the described work receiving element also results in an improved controllability of the acceleration and the speed of the piston tip. In the starting up method, the piston tip is preferably moved at a higher acceleration than in the operating mode to drive the molten metal into the nozzle chamber and the nozzle channel. For realising high accelerations, a work amount has to be transferred to the actuator within a short time. In the operating mode in which lower accelerations of the piston tip are required, on the other hand, the work amount should be transferred to the actuator more slowly, that means within a prolonged period of time. The control unit also includes an area for the change of the transferred work amount over time in which it operates with a particularly high precision. In other operating ranges, on the other hand, the control unit functions less precisely, and the acceleration of the piston tip can therefore be set less precisely in these areas. The parallel connection of the work receiving element according to the requirements and the associated admission of a partial amount of the transferred work amount by the work receiving element according to the requirements can advantageously be used to precisely set the acceleration and the speed of the piston tip. For example, if a work receiving element having the same storage capacity as the actuator is connected in parallel to the actuator, the work amount per time which is transferred to the actuator will be halved with the settings of the control unit remaining the same. In this way, the acceleration of the piston tip by the actuator is also substantially halved.

The previously described provision or the previously described use of a work receiving element which is connectable in parallel to the actuator as required is advantageously also independent of the method for starting up the print head according to the invention. Therefore, also a method for operating a print head for processing liquid molten metal is disclosed, the print head comprising the following components:
- a crucible for accommodating a metal to be printed,
- a heating device for melting the metal,
- a nozzle which is connected to the crucible and which includes a nozzle chamber and a nozzle channel extending along an expulsion direction, the nozzle chamber and the nozzle channel merging into each other,
- an actuator including a piston having a piston tip introducible into the nozzle chamber, the actuator being configured to linearly move the piston back and forth at an amplitude, particularly in a direction parallel to the expulsion direction, the method comprising the following steps:
I. starting up the print head for preparing it for an operating mode in which the print head expels molten metal in drops to form a component,
II. transferring the print head into the operating mode, the amplitude of the movement of the piston tip in process steps I. and II. being generated by a work amount provided by a control unit and acting in the actuator, a work receiving element being provided which is designed to receive a partial amount of work, and the work receiving element receiving part the work amount provided by the control unit in process step II, only the remaining part of the work amount being converted by the actuator in process step II.

In this method, starting up the print head in process step I. may take place according to any starting up method and is not limited to the starting up method according to the invention. Here, the parallel connection of the work receiving element as required results in the same advantages of a more precise control of the actuator which were previously described in connection with an embodiment of the method according to the invention. Therefore, this method as well results in an improvement of the quality and the reproducibility of printing by means of a print head.

Skillfully, it is contemplated that an expulsion detection device is used which determines whether molten metal is expelled from the nozzle channel out of the print head. In this embodiment, it is manually or automatically determined by an expulsion detection device whether or not molten metal is expelled from the nozzle channel. Here, the expulsion detection device may be based on various physical operating principles.

In a preferred implementation, it is contemplated that the expulsion detection device comprises a flashlight source, a camera, and an electronic detection unit, the detection unit determining whether molten metal is expelled from the nozzle channel out of the print head by means of an automatic analysis of images captured by the camera. In this embodiment, an electronic detection unit optically determines whether or not molten metal is expelled from the nozzle channel out of the print head. In addition, a flashlight source also referred to as a stroboscope is provided which emits flashes of light in short time intervals and potentially illuminates expelled drops of molten metal. Here, the illumination may take place from the same direction in which also the camera is disposed, or from a position which is located opposite of the camera relative to the drops. The drops may therefore be illuminated according to either the reflected light method or the transmitted light method. During each of these flashes of light, the camera captures an image of an area adjacent to the nozzle channel. The electronic detection unit automatically determines whether drops of molten metal are visible in the image by analysing these image data captured by the camera.

Skillfully, it is contemplated that the amplitude of the movement of the piston tip in process step C) is 0.5 µm to 60 µm. An amplitude in this range has been found to be particularly effective for removing air bubbles from the liquid molten metal in the nozzle channel. Preferably, the starting amplitude in process step D) and/or the operating amplitude is also in this order of magnitude. The amplitude in the operating mode may also be in the indicated range.

In an advantageous implementation, it is contemplated that the actuator comprises at least one piezo element which is coupled to the piston, the main expansion direction of the piezo element being directed parallel to the longitudinal axis of the piston, the control unit controlling the expansion of the piezo element and thus the back and forth movement of the piston tip coupled to the piezo element, the backward movement of the piston being at least partly induced by a spring force, the work amount transferred to the piezo element by the control unit in the form of an electric charge being correlated to the amplitude of the piston tip. In this embodiment, the actuator is based on the operating principle of a piezo element. Piezo elements are characterised by a high accuracy in the generation of an amplitude. Furthermore, piezo elements can be controlled at an extremely high clock frequency so that even the high frequencies in process step C) can be realised by such an actuator. When a determined charge amount which is a work amount is applied to a piezo element an expansion of the piezo element will take place. This effect is typically used for inducing a forward movement of the piston and the piston tip. The generation of a corresponding backward movement is usually achieved by removing the electric charge from the piezo element and, at the same time, by the piezo element being pushed back into a non-expanded state by a correspondingly positioned spring package. It is also possible to only remove part of the charge amount previously transferred to the piezo element for a backward movement of the piston and the piston tip. In this case, the piezo element remains in a partially expanded state and is therefore longer than in the state in which no charge amount at all is present at the piezo element. For controlling the actuator, the control unit may control the charge amount applied to the piezo element during the forward and during the backward movement independent of each other and therefore realise different amplitudes. The magnitude of the amplitude generated by a piezo element is directly correlated to the charge amount supplied to the piezo element by the control unit.

Skillfully, it is contemplated that the control unit controls the amperage at which the charge is transferred to the piezo element, the transferred amperage being correlated to the acceleration of the piston tip. The amperage has an influence on how rapidly a determined work amount or charge amount can be transferred to the piezo element. For increasing the transferred charge amount, either the amperage or the transfer time may be increased. Therefore, the amperage while charging and/or discharging the piezo element has a direct influence on the acceleration of the piston tip. When a higher acceleration of the piston tip is desired the piezo element is charged or discharged at a higher amperage so that the time for reaching the target capacity is reduced.

Moreover, it is contemplated that the actuator comprises a moving device which moves the piezo element including the piston coupled thereto relative to the nozzle in a direction parallel to the longitudinal direction of the piston in process step B1), the moving device being designed to generate an amplitude which is larger than the maximum amplitude of the expansion of the piezo element by at least the factor of ten. In this embodiment, the piston tip is moved by a moving device other than the piezo element in process step B1). Typically, the maximum possible amplitude of a piezo element is in the order of magnitude of 60 µm. For significantly encouraging the wetting of the nozzle chamber and of the nozzle channel, a movement of the piston tip in the order of magnitude of some millimetres has been found to be particularly effective in process step B1). Piezo elements are not capable of generating such large amplitudes. Therefore, an additional moving device is provided as part of the actuator. In a simple embodiment, this moving device may be formed by, for example, a guide parallel to the expulsion direction. For performing process step B1), the piezo element including the piston attached thereto is separated from the remaining parts of the actuator and manually moved back and forth. Following the implementation of process step B1), the piezo element is then fixed again, and the next process steps are performed. Alternatively, the moving device may also be formed by a linear axis moving the piezo element and the piston including the piston tip back and forth in process step B1). Such a linear axis typically comprises at least one guide and a linear drive controlled by the control unit. The moving device may move the piezo element together with the piston. Alternatively, it is also possible that, in process step B1), the piezo element is not moved, and only the piston including the piston tip is moved back and forth by the moving device.

Moreover, it is advantageously contemplated that, in process step C1), the overpressure inside the crucible is reduced by at least the factor of four as compared to the overpressure inside the crucible in process step B). Preferably, an overpressure relative to the environment is also maintained in process step C1) to encourage the subsequent supply of liquid molten metal into the nozzle.

In an advantageous implementation, it is contemplated that the overpressure inside the crucible is 20 mbar to 30 mbar in process step B), and/or that the overpressure inside the crucible is 3 mbar to 8 mbar in process step C1). The described overpressures have been found to be particularly advantageous for starting up a nozzle channel.

In another embodiment, it is contemplated that, in process step C), the movement of the piston tip couples vibrations into the molten metal, and that the inner surface of the nozzle channel is at least partly wetted by the vibrating molten metal. The high-frequency movement of the piston tip in process step C) induces vibrations in the liquid molten metal. Air bubbles are dissolved, and a wetting of the metallophobic surface inside the nozzle chamber and inside the nozzle channel is encouraged by these vibrations.

Moreover, it is advantageously contemplated that, in process step D), the starting amplitude is generated by a starting charge supplied to the piezo element including the actuator by the control unit, and that, during the gradual reduction of the amplitude, the charge supplied to the actuator is gradually reduced. In this embodiment, the amplitude of the piston tip is directly correlated to a charge amount transferred to a piezo element belonging to the actuator by the control unit. Consequently, in process step D), a reduction the transferred charge amount results in a reduction of the amplitude performed for determining the limit amplitude. Alternatively, it is feasible to provide an actuator which does not comprise a piezo element and is based on another physical operating principle. For example, a pneumatic actuator could be provided in which the amplitude is determined by an amount of compressed air which is supplied to the actuator by the control unit for moving the piston tip. In this case, the starting amplitude is determined by a specified amount of compressed air which is progressively reduced in the further course of process step D).

In an advantageous implementation, it is contemplated that, in process step D), the limit amplitude is produced by a limit charge supplied to the actuator by the control unit. If the actuator comprises a piezo element which moves the piston tip the limit amplitude determined in process step D) is produced by a limit charge. This limit charge is the charge amount at which liquid molten metal is barely expelled from the nozzle channel. In the operating mode of the print head, then, charges or charge amounts which are larger than or equal to the limit charge will be used for producing a component.

In one embodiment, it is contemplated that the work amount provided by the control unit for moving the piston tip is provided in the form of an electric charge which is at least partly converted in the piezo element of the actuator, and that the work receiving element is formed by an electric capacitor which is connectable in parallel to the piezo element as required, the work receiving element not being connected in parallel to the piezo element in process steps C) and D), and the work receiving element being connected in parallel to the piezo element in the operating mode to receive a partial amount of work of the work amount provided by the control unit in the form of an electric charge. In this embodiment of the method, the actuator also comprises a piezo element which moves the piston tip directly proportional to a charge transferred to the piezo element by the control unit. In this case, the work amount provided by the control unit is provided as an electric charge or an electric charge amount. In process steps C) and D), the entire charge amount provided by the control unit is transferred to the piezo element resulting in an associated movement of the piston tip at a large amplitude. Consequently, the entire electric amperage output by the control unit is transferred to the actuator which results in a high acceleration of the piston tip. In this embodiment, moreover, the previously described work receiving element is formed by an electric capacitor optionally connectable in parallel to the piezo element. For performing the method and particularly process steps C) and D), the work receiving element in the form of the capacitor is preferably not used so that the entire charge amount and/or amperage is transferred to the piezo element. In the operating mode, i.e., after having carried out the method for starting up the nozzle channel, the electric capacitor is then preferably connected in parallel to the piezo element so that part of the charge amount and/or amperage provided by the control unit is transferred to the capacitor, and only a remaining part is transferred to the piezo element. In this embodiment, therefore, the capacitor receives a partial amount of work in the form of an electric charge or a partial amount of the electric amperage from the control unit. In this way, the control unit can be operated in a very similar manner as in performing the starting up method and particularly outputs charge amounts and/or amperages in a comparable order of magnitude. In this way, the control unit can always be operated in an optimum working range or operating range in which the accuracy of the control and the reproducibility the output charge amount is optimal. Altogether, these parallel connections of a piezo element to an electric capacitor result in a stable and precise system having a simple design for controlling the print head both during the start-up and in the operating mode. In the operating mode, it has been found to be advantageous to move the piston tip in the nozzle chamber at a lower acceleration than in the starting up method. A lower acceleration, particularly during the return movement of the piston tip after the expulsion of a drop from the nozzle channel, prevents ambient air from being sucked in through the nozzle channel to compensate the volume vacated by the piston tip in the nozzle chamber. The acceleration of the piston tip is controlled by the amperage flowing from the control unit to the actuator or vice versa. Here, the control unit has a minimum possible amperage at which the transport of the charge to and from the piezo element can be performed. This minimum possible amperage correlates to the minimum limitation of the acceleration of the piston tip. Owing to a parallel connection of a capacitor as the work receiving element according to the requirements, part of the transferred amperage will flow into this capacitor so that the amperage effectively flowing to the piezo element can be reduced below the minimal possible amperage of the control unit. In this case, the parallel connection of the capacitor has the effect of an additional reduction of the acceleration of the piston tip which may result in more reproducible printing results in the operating mode. Of course, a parallel connection of the capacitor to the piezo element may also be used to reduce the amperage when charging the piezo element and thereby the acceleration of the piston tip during the expulsion of a drop. A work receiving element formed by a capacitor can therefore be used in combination with the settings of the control unit for influencing both the amplitude and the acceleration of the piston tip. Here, the electric parameters charge amount and amperage can be set and changed independent of each other in the control unit to obtain favourable results. For example, it is also possible to connect the capacitor in parallel to the piezo element to increase the output charge amount, and to, at the same time, reduce the output amperage in the operating mode. In this case, for example, the piston tip can be moved at a higher amplitude than in the starting up method, however, at a reduced acceleration as compared to the starting up method in the operating mode. Influencing the amplitude and the acceleration can take place independent of each other.

Advantageously, it is contemplated that, in process steps E) and F), n is equal to 2. In this embodiment, n=2 applies so that process step D) is repeated twice after a first implementation according to process step E). In this way, a limit amplitude is determined three times before the completion of the method according to process step F). On the basis of these three determined values for a limit amplitude, it can already be said with a high certainty whether a complete wetting of the nozzle channel has already taken place. Of course, n may also assume other values and be selected to be, for example, 0 to 10. Moreover, n may also be dynamically adapted to the already determined values for the limit amplitude. Such a dynamic adaptation is to be understood to mean that the method is completed according to process step F) at n=2 if it holds true for all three determined limit amplitudes that they are lower than a previously defined limit amplitude. If this is not the case, i.e., if one or more of the three determined limit amplitudes are larger than the previously defined limit amplitude, n is increased by 1, and the starting up method is continued until a limit amplitude which is smaller than the previously defined limit amplitude is determined in three successive implementations of process step D). This dynamic adaptation of n may alternatively also be performed based on a variation of a plurality of previously determined limit amplitudes. If there is a strong variation in successively determined limit amplitudes, this may be indicative of an insufficient wetting of the nozzle channel. In this case, the starting up method is continued until the variation is below a previously defined value. Associated values for a previously defined limit amplitude or a previously defined maximum variation in the limit amplitude may be determined, for example, by previously performed experiments. As an alternative to the assessment of the wetting according to the invention by means of a statistically certain realisation of a defined limit amplitude, the degree of wetting may also be optically determined. In such an optical determination, it is verified whether the area of the inner wall of the nozzle channel adjacent to the discharge opening of the nozzle channel which is visible from outside of the print head is actually wetted with molten metal, for example, with the aid of a camera. However, such an optical determination is considerably more error-prone and complicated than the described method for starting up a print head.

The object of the invention is further solved by a print head for processing liquid molten metal comprising:
  a crucible for accommodating a metal to be printed,
  a heating device for melting the metal,
  a nozzle connected to the crucible and including a nozzle chamber and a nozzle channel extending along an expulsion direction, the nozzle chamber and the nozzle channel merging into each other,
  an actuator including a piston having a piston tip introducible into the nozzle chamber, the actuator being configured to linearly move the piston back and forth, particularly in a direction parallel to the expulsion direction,
  a control unit controlling the actuator, the control unit being designed to perform a method according to one of the previously described embodiments.

The print head according to the invention is provided to carry out the method according to the invention. Some of the elements or components of the print head according to the invention were already described above in connection with the method. With regard to these elements or components, reference is made to the above description. The print head according to the invention further comprises a control unit configured to carry out the method according to the invention and to correspondingly control the other elements or components of the print head. This control unit may also be referred to as a control module or as an electronic control unit (ECU). Here, the control unit comprises at least one central processing unit CPU, a memory, as well as input interfaces and output interfaces for the data and information exchange with the components of the print head as well as with an operator of the print head. Moreover, the control unit may include further hardware components, for example, for controlling and regulating a charge amount to be transferred to the actuator. In the memory of the control unit, values and defaults are stored in the form of data required for carrying out the method according to the invention. Moreover, the control unit may be connected to a data network to also render the exchange of data over distances possible. A print head according to the invention is advantageous since, due to its capability of carrying out the method according to the invention, it renders the use of more cost-effective, metallophobic components for the production of the nozzle channel possible and, at the same time, provides for reproducible and high-quality results in the production of components. At the same time, the use of metallophobic components prevents an undesired contamination of the nozzle. The print head according to the invention has a simple and robust design and renders a reliable method for starting up a new, so far unused nozzle channel possible based on hardware components or components also used for producing components.

In one embodiment of the nozzle head, it is contemplated that the nozzle comprises an insert which is inserted in the crucible, and that the nozzle chamber is implemented as a cavity in the insert, and that the nozzle further includes a nozzle plate which, at least partly, forms a boundary of the nozzle chamber, the nozzle plate and the insert being releasably connected to each other by a clamping element, and the nozzle channel being configured as a cavity extending completely through the nozzle plate. In this embodiment, the nozzle is formed by multiple parts. The nozzle comprises an insert constituting the connecting interface to the crucible. The nozzle channel is disposed in a nozzle plate which is a component other than the insert. The nozzle plate and the insert are connected to each other by a clamping element. Since the nozzle channel is subject to wear in the production of components and therefore needs to be replaced from time to time, the nozzle channel is disposed in a readily replaceable nozzle plate in this embodiment. This renders the fast and cost-effective exchange of the nozzle channel of the nozzle possible. Of course, other embodiments of the nozzle are also feasible. For example, an insert may not be provided, and parts of the nozzle may be integrally formed with the crucible. In this embodiment, the nozzle channel may also be disposed in a replaceable nozzle plate connected to other components of the nozzle or of the crucible via a clamping element.

Moreover, it is contemplated that the nozzle plate is made of a metallophobic material and/or the surface of the nozzle plate and of the nozzle channel are metallophobic. As previously described, metallophobic surfaces of the nozzle are advantageous since they eliminate or prevent an undesired adherence of molten metal. It is therefore easy and cost-effective to provide the entire nozzle plate with metallophobic surfaces. For avoiding difficulties in the wetting of the interior of the nozzle channel, the method according to the invention is provided.

Skillfully, it is contemplated that the nozzle plate is made of graphite or a graphite-based material, and that the nozzle channel is implemented as a hole in the nozzle plate. In this embodiment, the nozzle plate is made of a graphite-based material. Such a material is high temperature-resistant and can be formed in a simple manner. The nozzle channel is formed by a cylindrical cavity in the nozzle plate. Here, the nozzle channel may have a plurality of different inner diameters which merge into each other via rounded or inclined sections.

Skillfully, it is contemplated that the actuator comprises a piezo element, and that the actuator and/or the control unit comprises a work receiving element formed by an electric capacitor, the control unit being configured to electrically connect the piezo element in parallel to the work receiving element as required. In this embodiment, the print head comprises a work receiving element in the form of an electric capacitor. This capacitor is disposed in the vicinity of the actuator which comprises a piezo element, or in the vicinity of or in the control unit. The work receiving element is provided to receive part of the work amount provided by the control unit in the form of an electric charge in the operating mode. For this purpose, further, a circuit is provided which renders connecting the work receiving element in parallel to the actuator possible when required, i.e., typically in the operating mode of the print head. Moreover, the circuit renders the interruption of the parallel connection of the work receiving element to the actuator possible in the method for starting up the print head and the nozzle channel so that the entire work amount provided by the control unit is transferred to the actuator. The control unit is designed to automatically establish a parallel connection of the work receiving element to the actuator when required.

Features, effects, and advantages disclosed in connection with the method are also deemed disclosed in connection with the print head. The same applies in the reverse; features, effects, and advantages disclosed in connection with the print head are also deemed disclosed in connection with the method.

BRIEF DESCRIPTION OF THE DRAWINGS

In the Figures, embodiments of the invention are schematically illustrated. Here.

DETAILED DESCRIPTION

In the Figures, identical elements are designated by the same reference numerals. In general, the described properties of an element described in connection with one Figure also apply to the other Figures. Directional information such as upper or lower refer to the described Figure and are applicable to other Figures according to their meaning.

Figure 1:
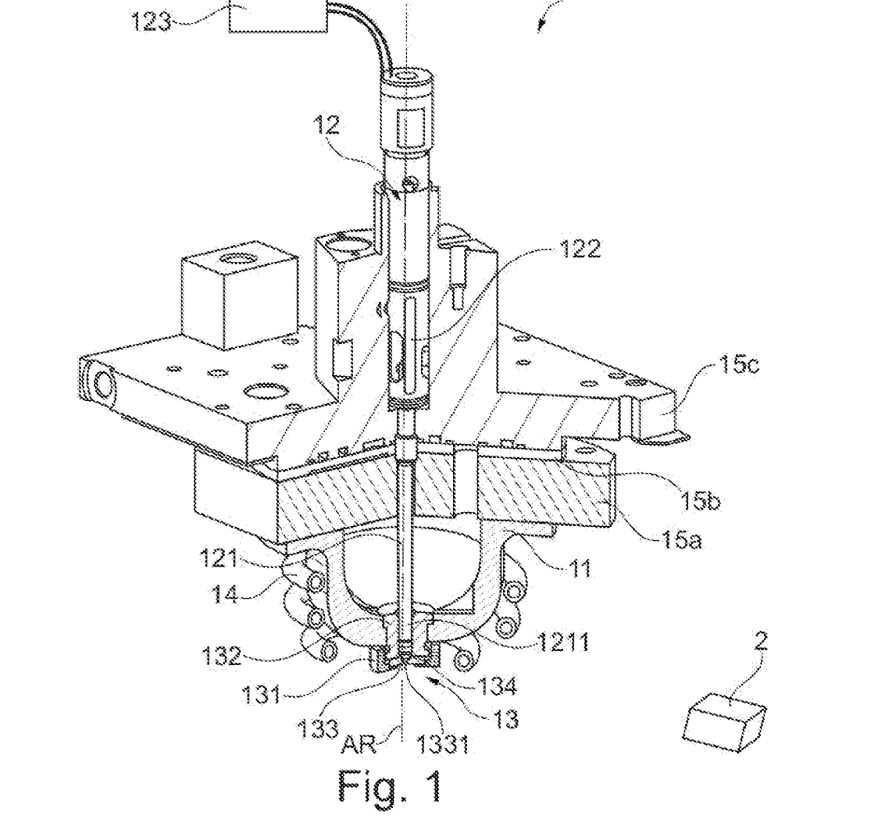
FIG. 1 shows a perspective, partly cross-sectional view of an embodiment of a print head.

FIG. 1 shows a perspective, partially cross-sectional view of an embodiment of a print head 1. In the illustration, the most relevant components of the print head 1 are schematically illustrated. The print head 1 may comprise other components which are not illustrated or described. The print head 1 comprises a crucible 11 which accommodates the metal which is to be printed with the aid of the print head 1. The crucible 11 is made of a heat-resistant material, preferably of ceramic. On the outer wall of the crucible 11, a heating device 14 is disposed which is provided for heating the crucible 11 and the metal contained therein. In the illustrated embodiment, the heating device 14 is implemented as an induction heater which generates heat by means of the flow of electric current through resistive conductors. Alternatively, it is also possible to use a heating device 14 which is based on another physical operating principle, for example a resistance heater. Moreover, the heating device 14 may also be disposed in the wall of or inside the crucible 11. The metal to be printed may be supplied to the crucible 11 in a solid form, for example in the form of pellets or a wire. Alternatively, the metal to be printed may also be supplied to the crucible 11 in an already liquid form as a melt. In the lowermost section of the crucible 11, the nozzle 13 is disposed from which liquid molten metal is discharged in the operating mode of the print head 1 to produce components. In the illustrated embodiment, the nozzle 13 comprises an insert 132 which is directly connected to the crucible 11. Inside the insert 132, the nozzle chamber 134 is located. Here, the nozzle chamber 134 is designed to be substantially cylindrical and extends along the expulsion direction AR. The expulsion direction AR is the direction in which liquid molten metal is expelled in the form of drops in the operation of the print head 1. The nozzle chamber 134 is defined by the insert 132 in the circumferential direction. In an alternative embodiment, a nozzle chamber 134 may also be disposed directly in the crucible 11 and defined by it in the circumferential direction. In this case, the nozzle does not comprise an insert 132. The front side of the nozzle chamber 134 facing downwards is confined by a replaceable nozzle plate 133. In the nozzle plate 133, the nozzle channel 1331 extending along the expulsion direction AR is disposed. The nozzle channel 1331 extends through the entire nozzle plate 133. Here, the nozzle channel 1331 has a cross-section which varies along the expulsion direction AR. On the side facing the insert 132, the cross-sectional area of the nozzle channel 1331 is larger than on the side facing away from the insert 132. With the aid of this this narrowing of the nozzle channel 1331 along the expulsion direction AR, drop formation is encouraged while printing since the liquid molten metal is accelerated in the lower, narrower section of the nozzle channel 1331. The discharge opening of the nozzle channel 1331 on the lower side is preferably designed to be sharp-edged which also encourages drop separation. Here, the nozzle plate 133 is implemented as a cylindrical disc and made of a graphite-based material. The clamping element 131 detachably connects the nozzle plate 133 and the insert 132 to each other. Here, the clamping element 131 is implemented as a clamping nut which is screwed onto a thread disposed on the outer circumference of the insert 132. Alternatively, the clamping element 131 may also be implemented as a cap which is clipped onto the outer circumference of the insert 132 without a thread. The connection between the clamping element 131 and the insert 132 may also be realised by other positively engaging elements, for example in the manner of a bayonet lock. In the operation of the print head, the clamping element 131 clamps the nozzle plate 133 onto the lower front side of the insert 132 and seals the nozzle chamber 134 in this way. For replacing the nozzle plate 133, the clamping element 131 is removed, and the nozzle plate 133 is replaced by a new nozzle plate 133. In the illustrated embodiment, all surfaces of the nozzle plate 133 are metallophobic. The insert 132 and the nozzle plate 133 together define the nozzle chamber 134 which is open towards the interior of the crucible 11. The nozzle chamber 134 forms a compression space in which pressure is applied to liquid molten metal by the piston tip 1211 and it is expelled from the nozzle 13 through the nozzle channel 1331 in this way.

The expulsion of liquid molten metal from the print head 1 is induced by a back-and-forth movement of the piston 121 parallel to the expulsion direction AR. On its lower end, the piston 121 has a piston tip 1211 which is introducible into the nozzle chamber 134. On its upper end, the piston 121 is connected to the actuator 12. Due to the high temperatures in the crucible 11 and in the nozzle 13, the piston 121 is made of a ceramic material here. The outer cross-section of the piston tip 1211 is slightly smaller than the inner cross-section of the nozzle chamber 134 in its cylindrically shaped section. Therefore, there is a distance in the radial direction to the expulsion direction AR in a state in which the piston tip 1211 is introduced into the nozzle chamber 134. This distance results in that liquid molten metal can flow from the crucible 11 past the piston tip 1211 into the nozzle chamber 134 and in the direction of the nozzle channel 1331. During the back and forth movement of the piston tip 1211, therefore, molten metal is subsequently supplied in the direction towards the nozzle channel 1331 through the distance between the piston tip 1211 and the wall of the nozzle chamber 134. When the piston tip 1211 is withdrawn from the nozzle chamber 134 molten metal subsequently flows from crucible 11 through the distance in the direction of the nozzle chamber 134 and the nozzle channel 1331, the piston tip 1211 preferably always partly remaining inside the nozzle chamber 134. During the movement of the piston tip 1211 in the direction from crucible 11 towards the nozzle channel 1331, part the molten metal present between the end of the piston tip 1211 facing downwards and the nozzle channel 1331 flows back upwards through the distance in the direction of the crucible 11. The impulse transferred to the molten metal by the moving piston tip 1221 to expel it from the nozzle channel 1331 can be adjusted by the magnitude or the cross-sectional area of the distance. Here, the distance between the piston tip 1211 and the wall of the nozzle chamber 134 may be constant in the circumferential direction around the piston tip 1211. Alternatively, this distance may also vary in size in the circumferential direction. For example, the otherwise cylinder-shaped piston tip 1211 may be flattened in subsections so that a larger distance will be formed between the piston tip 1211 and the nozzle chamber 134 in these areas. The actuator 12 is provided to move the piston 121 upwards and downwards in the illustration. The actuator 12 comprises a piezo element 122 expanding upon a transfer of an electric charge. The piezo element 122 comprises a plurality of stacked individual elements. The actuator 12 comprising a piezo element 122 can move the piston 121 at an amplitude of about 90 μm at maximum. The piezo element 122 is therefore capable of generating most amplitudes for carrying out the method and for printing components by means of the print head 1. However, if process step B1) is to be performed, this maximum amplitude of the piezo element 122 is insufficient. Therefore, an additional moving device capable of moving the piston 121 or the entire actuator 12 back and forth in the expulsion direction AR at an even larger amplitude may be provided. In the illustrated embodiment, the actuator 12 can be separated from the remaining print head 1 and manually moved back and forth in a guide in the range of several millimetres. In this case, the moving device is formed by the guide between the actuator 12 and the remaining print head 1. Alternatively, the moving device may also comprise a linear motor or the like which can separately move the actuator 12 including the piston 121 or only the piston 121 alone parallel to the expulsion direction AR at an amplitude which is in the range of several millimetres.

The print head 1 further comprises a plurality of housing parts 15a, 15b, and 15c, which connect the crucible 11 and the actuator 12 to each other. The housing part 15a supports the crucible 11 and is, at the same time, a thermal insulation of the crucible 11 heated in operation towards the actuator 12. The housing part 15c accommodates and fixes the actuator 12. Moreover, the housing part 15c may serve as a guide for the actuator 12 when it is manually shifted relative to the remaining print head 1 at a larger amplitude in process step B1. At the same time, the housing part 15c serves as a flange by means of which the print head 1 can be attached to other machine components, and for accommodating sensors. The housing part 15b serves to cool the housing part 15c and the actuator 12. The housing part 15b may include, for example, channels through which a cooling liquid such as, for example, water is guided. In this way, heat leaking through the insulating housing part 15a from crucible 11 can be dissipated from the print head 1. In the crucible 11, high temperatures prevail during the operation of the print head 1 to keep metal in the molten form. Such high temperatures would damage the actuator 12. Therefore, the crucible 11 and the actuator 12 are disposed in the print head 1 so that they are thermally insulated from each other, and preferably, a cooling device is disposed between the two components.

Above of the actuator 12, a control unit 123 is schematically illustrated. This control unit 123 is connected to the actuator 12 and transmits an electric charge to the actuator 12 to move the piston 121. The control unit 123 is also provided for carrying out the method according to the invention in an at least partly automated fashion. For this purpose, the control unit 123 may include other interfaces which are not illustrated, for example to sensors or other actuators, the heating device 14 or the like.

Below of the print head 1, an expulsion detection device 2 is schematically illustrated. This expulsion detection device 2 optically determines whether or not liquid molten metal in the form of drops is expelled from the nozzle channel 1331 while the method for starting up the print head 1 is performed. The determined results of the expulsion detection device 2 are transmitted to the control unit 123 and integrated in the control of the performance of the method for starting up the print head 1 there.

Figure 2:
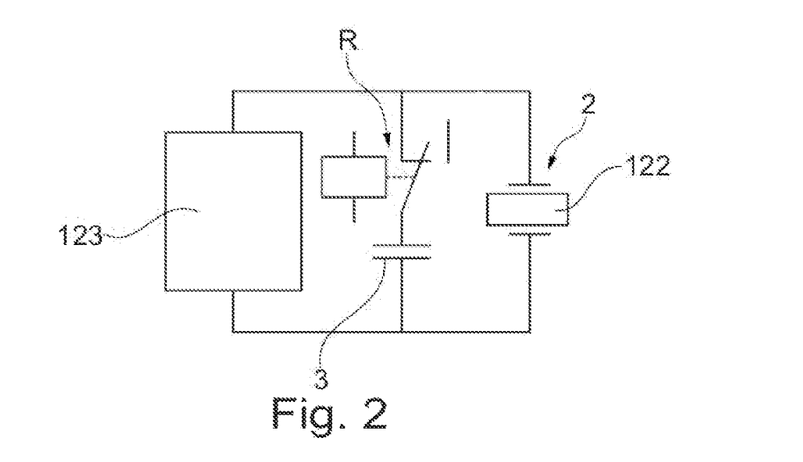
FIG. 2 shows a circuit diagram of an embodiment of a circuitry of a control unit, an actuator, and a work receiving element.

FIG. 2 shows a circuit diagram of an embodiment of a circuitry of a control unit 123, an actuator 12, and a work receiving element 3. In FIG. 2, a circuit is illustrated which influences the work amount in the form of an electric charge transferred to the actuator 12 by the control unit 123. On the left side, the control unit 123 is schematically illustrated. The control unit 123 is connected to the piezo element 122 of the actuator 12 by two conductors. Here, a work receiving element 3 in the form of an electric capacitor is connected in parallel to the piezo element 122. In the state illustrated in FIG. 2, the work receiving element 3 and the piezo element 122 are connected in parallel to each other, and both are connected to the control unit 123. In this state, part of a work amount in the form of a charge amount output by the control unit 123 flows into the piezo element 122, and another part of the output work amount flows into the work receiving element 3. Consequently, partial amounts of the work flow back to the control unit 123 both from the work receiving element 3 and from the piezo element 122. The parallel connection of the work receiving element 3 to the piezo element 12 can be interrupted by the relay R. When the parallel connection of the work receiving element 3 is interrupted or suspended the entire work amount output by the control unit 123 will exclusively flow to the piezo element 122. The work amount transferred to the piezo element 122 by the control unit 123 directly correlates to the amplitude generated by the piezo element 122. Therefore, a parallel connection of the work receiving element 2 to the piezo element 122 results in a reduction of the amplitude and/or of the acceleration of the piston tip generated by the piezo element 122 with the same work amount being output by the control unit 123. When the parallel connection of the work receiving element 3 to the piezo element 122 is interrupted by the relay R this results in an increase of the amplitude and/or the acceleration with the same work amount being output by the control unit 123. Such a circuitry of the components is particularly advantageous for being capable of always operating the control unit 123 in its optimum operating range while nevertheless being capable of generating amplitudes and/or accelerations having different magnitudes at the piezo element 122. For implementing the method for starting up the print head 1, usually larger amplitudes and a larger acceleration are required than in the operating mode of the print head. Therefore, during the start-up, particularly in process step C), the parallel connection of the work receiving element 3 is interrupted. For the operating mode, then, the parallel connection of the work receiving element 3 to the piezo element 122 is established by the relay R. In the operating mode, a work amount of the same or a similar magnitude as during the start-up is output by the control unit 123, however, this work amount is distributed to the work receiving element 3 and the piezo element 122 so that the piezo element 122 generates a smaller amplitude than during the starting up method. For carrying out process step D), the parallel connection may also be established, particularly for the determination of the limit amplitude at the end of this process step. In the operating mode, the piston tip is typically moved at amplitudes which are larger than the limit amplitude, for example to expel drops having a larger diameter while printing. This increase of the amplitude in the operating mode may be realised by the control the control unit 123 while maintaining the parallel connection of the work receiving element 3. The change of the charge amount output by the control unit 123 with time corresponds to the output or received amperage. The parallel connection of the piezo element 122 and the work receiving element 3 also influences the amperage transmitted between the control unit 123 and the piezo element 122. Here, the parallel connection reduces the transferred amperage so that the effective acceleration of the piston tip 1211 is reduced. In the starting up method, higher accelerations of the piston tip 1211 are required than in the operating mode. This requirement is also met by the described parallel connection in the operating mode, and therefore, the quality of the printing results is improved. For reproducible printing results, it is important that the control unit 123 outputs a reproducible, accurate charge amount and/or amperage. A precise output of a specific charge amount and/or amperage is optimal in an operating range of the control unit 123 and deteriorates the larger the deviation from this optimum operating range becomes. The illustrated circuit therefore at the same time benefits reproducible printing results and a reliable method for starting up the print head 1.

Figure 3:
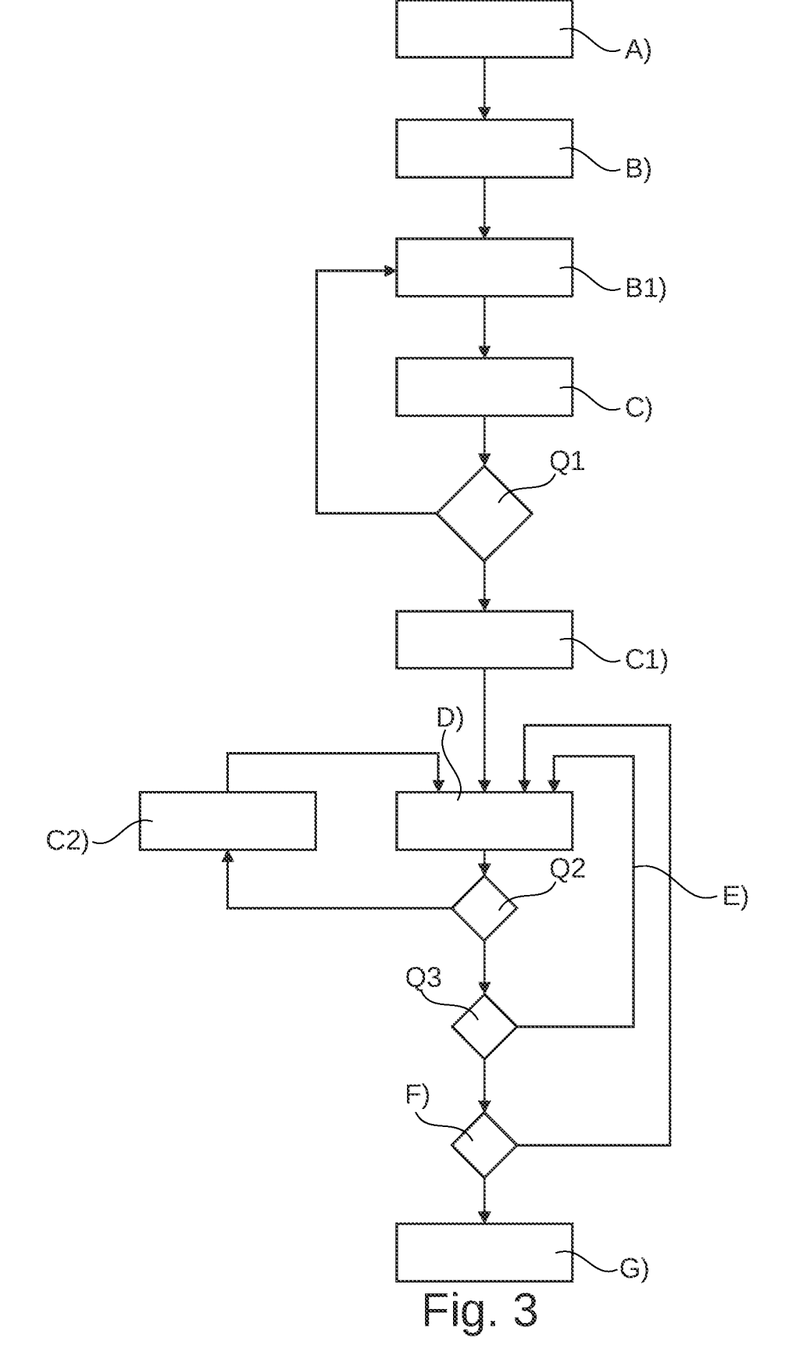
FIG. 3 shows a flow diagram of an embodiment of the method for starting up a print head.

FIG. 3 shows a flow diagram of an embodiment of the method for starting up a print head 1. The illustrated diagram explains the process sequence of the method for starting up a print head 1 and shows various alternatives in its flow. Features relating to the individual process steps A) to F) were also described previously, therefore, also the above description is made reference to here.

In the first process step A), the print head is prepared for the starting up method. For this purpose, metal is melted inside the crucible 11, and the piston tip 1211 is introduced into the nozzle chamber 134. As early as in this state, it is possible that molten metal enters the nozzle chamber 134 and the nozzle channel 1331.

In the following process step B), an overpressure is produced inside the crucible 11. This overpressure supports the transport or the transfer of liquid molten metal from the crucible 11 into the nozzle channel 1331.

In the following process step B1), the piston tip 1211 is now moved back and forth inside the nozzle chamber 134 along or parallel to the expulsion direction AR, this movement taking place at a considerably larger amplitude than the movements of the piston tip 1211 in the other process steps. This movement of the piston tip 1211 transports liquid molten metal into the nozzle chamber 134 and the nozzle channel 1331. The frequency at which the piston tip 1211 is moved in process step B1) is considerably lower than the frequencies in the other process steps or in the operating mode. Process step B1) is optional here and does not imperatively have to be performed. However, it has been found that a movement of the piston tip 1211 according to process step B1) at an amplitude in the range of several millimetres significantly improves or accelerates the method for starting up the print head 1.

In the following process step C), the piston tip 1211 is now moved back and forth at a high filling frequency FF which is higher than 1 kHz. Air bubbles in the molten metal are dissolved by this high-frequency movement so that large areas of the inner surface of the nozzle channel 1331 are wetted as early as in this step. However, process step C) is performed until molten metal is expelled from the nozzle channel 1331 (spray). Preferably, an expulsion detection device 2 is used for detecting such an expulsion of molten metal.

In FIG. 3, the first query Q1 can be seen below process step C). In process step C), the piston tip 1211 is moved at the filling frequency FF until molten metal is expelled. However, there are cases in which no molten metal is expelled, for example when wetting is still insufficient in this process step. In such a case, process step C) is performed for a specified dwell time. After the expiry of this dwell time, process step C) is completed, and then the illustrated query Q1 takes place. In this query Q1, it is determined whether or not molten metal was expelled in process step C). If molten metal was expelled the method is continued with process step D). If no molten metal was expelled process step B1) is applied or repeated in which the piston tip is moved inside the nozzle chamber 134 slowly but at a large amplitude to convey additional molten metal in the direction of the nozzle channel 1331.

As soon as molten metal was expelled in a process step C), optionally, process step C1) may be performed in which the overpressure in the crucible 11 is reduced as compared to process step B). With such a reduction of the pressure in the crucible 11, preferably, pressure conditions as also prevailing in the operating mode of the print head 1 are established. Alternatively, the following process steps may also be performed at the higher overpressure according to process step B).

In the following process step D), a limit amplitude is now determined for the first time in the method. This limit amplitude is a value for an amplitude of the piston tip 1211 at which molten metal is barely expelled from the nozzle channel 1331. For determining this limit amplitude, the piston tip 1211 is moved at a starting up frequency IF which is considerably lower than the filling frequency FP in the process step C) and lower than the standard frequency SF at which the piston tip 1211 is moved in the operating mode for producing components. In process step D), the piston tip 1211 is initially moved at a starting amplitude. Here, it is determined whether molten metal is expelled. If this is the case the starting amplitude is gradually reduced, and it is respectively determined whether molten metal is still expelled at the reduced amplitude. With this successive approach of reducing the amplitude and determining whether an expulsion takes place, ultimately, the limit amplitude is determined.

In the following query Q2, it is queried whether or not, in the first pass of process step D), molten metal was expelled. In a case in which molten metal was expelled and therefore a limit amplitude was determined, the method is continued with query Q3. However, if, in the query Q2, it is determined that no molten metal was expelled in process step D) process step C2) is performed. In process step C2), like in process step C), the piston tip 1211 is also moved back and forth at the high filling frequency FF. Process step C2) is provided to dissolve air bubbles potentially still present in the molten metal. Such remaining air bubbles may be the cause of no molten metal being previously expelled in process step D) even at the starting amplitude. Here, process step C2) may be performed at an overpressure in the crucible 11 which is reduced as compared to process step B). Alternatively, process step C2) may also be performed at an overpressure according to process step B). Alternatively, it may also be queried whether a limit amplitude previously determined in process step D) is larger than a defined limit amplitude in query Q2. The defined limit amplitude may be a value which was empirically determined beforehand as a limit amplitude at which a drop expulsion takes place in case of a good wetting of the nozzle channel 1331. In a case in which the determined limit amplitude is larger than the defined limit amplitude, this allows for conclusions about an insufficient wetting. Therefore, in a case in which it is determined in query Q2 that a limit amplitude is larger than a previously defined limit amplitude, process step C1) may be performed as previously described to improve the wetting of the nozzle channel.

If previously an expulsion of molten metal was detected and/or a limit amplitude which is smaller than the defined limit amplitude was determined in a repetition of process step D) the method is continued with query Q3. In query Q3, it is determined whether a previously determined number of n repetitions of process step D) was already performed. If this is not the case, i.e., if the number of repetitions of process step D) is smaller than n, process step E) is performed. Process step E) is only a repetition of process step D) in which once again a limit amplitude is determined. In the flow diagram in FIG. 3, therefore, process step E) is an arrow which, starting from query Q3, is directed back to process step D) and therefore symbolises a repetition of this process step. After the repetition of process step D) according to process step E), the two queries Q2 and Q3 are performed again. With each cycle of process step E), the number of repetitions is respectively increased by one. When the actual number of repetitions determined in query Q3 is finally equal to the predetermined number of n repetitions process step F) is performed after query Q3.

In process step F), the method for starting up the print head 1 is completed. Since process step F) is substantially a query process step F) is illustrated as symbolized by the same diamond symbol as previously queries Q1 to Q3. However, the actual completion of the method, symbolized by the result G), will only take place when the limit amplitudes previously determined in process step D) are equal to or smaller than the defined limit amplitude in n successive repetitions. In this case, it can be assumed that the nozzle channel 1331 is reproducibly wetted and that therefore a reproducible and high-quality component production is possible in the subsequent operating mode. If the limit amplitudes determined in process step D) are all or in parts larger than the defined limit amplitude within the n last successive repetitions it can be assumed that the wetting of the nozzle channel 1331 is still insufficient. In this case, first another repetition of process step E) or D) and the following process steps is performed. Then, it is again assessed in process step F) whether all limit amplitudes from the n last successive repetitions are below the defined limit amplitude. If this is the case in the event of an increase in the number of the actual repetitions for the determination of a limit amplitude in process step D) the method is finally completed in process step G). If limit amplitudes which are larger than the defined limit amplitude occur within the last n successive repetitions the starting up method is continued. Alternatively, also another condition relating to the limit amplitudes determined last may be checked in process step F). Such another condition may be, for example, alternatively or additionally, an assessment of whether the limit amplitudes determined last exhibit a variation which is smaller than or equal to a defined permissible variation. Generally, a wide variety of analyses and assessments of the previously determined limit amplitudes may be performed in process step F). The completion of the method for starting up the print head 1 in process step G) may therefore be subject to a wide variety of conditions. In this way, the method is readily and flexibly adaptable to various requirements or applicants. In most cases, the wetting of the nozzle channel 1331 can be continuously improved by repeatedly performing process steps D) and/or C2) until finally, in process step F), a successful completion of the starting up method is determined. In rare cases, it may also occur that, despite of an increased number of repetitions, no completion of the method according to process steps F) and G) is possible. In this case, a manual or optical examination of the nozzle channel 1331 or the nozzle chamber 134 may contribute to solving the problem.

LIST OF REFERENCE NUMERALS

1 Print head
11 Crucible
12 Actuator
121 Piston
122 Piezo element
123 Control unit
1211 Piston tip
13 Nozzle
131 Clamping element
132 Insert
133 Nozzle plate
1331 Nozzle channel
134 Nozzle chamber
14 Heating device
15a, b, c Housing part
2 Expulsion detection device
3 Work receiving element
R Relay
AR Expulsion direction
SF Standard frequency
FF Filling frequency
A) Process step
B) Process step
B1) Process step
C) Process step
C1) Process step
C2) Process step
D) Process step
E) Process step
F) Process step
G) Process step
Q1 First query
Q2 Second query
Q3 Third query

The invention claimed is:

1. A method for starting up a nozzle channel of a print head for processing liquid molten metal, wherein the print head comprises the following components:
  a crucible for accommodating a metal to be printed,
  a heating device for melting the metal,
  a nozzle connected to the crucible and including a nozzle chamber and a nozzle channel extending along an expulsion direction, wherein the nozzle chamber and the nozzle channel merge into each other,
  an actuator including a piston having a piston tip introducible into the nozzle chamber, wherein the actuator is configured to linearly move the piston back and forth, in a direction parallel to the expulsion direction, the method comprising the following steps:
  A) preparing the print head, wherein metal is melted in the crucible to form a molten metal, and the piston tip is introduced into the nozzle chamber, wherein, in the introduced state, there is a distance, at least in sections, between the piston tip and the nozzle chamber in the radial direction to the expulsion direction
  B) creating an overpressure inside the crucible which encourages molten metal to enter the nozzle chamber,
  C) moving the piston tip in the nozzle chamber, wherein the piston tip is moved back and forth by the actuator at a filling frequency which is larger than or equal to 1 kHz until molten metal is expelled from the nozzle channel out of the print head,
  D) moving the piston tip in the nozzle chamber, wherein the piston tip is moved back and forth by the actuator, wherein the movement is initially performed at a starting amplitude at which the molten metal is expelled from the nozzle channel out of the print head, and subsequently the amplitude of the movement is gradually reduced, and wherein the movement is performed with gradual reduction of the amplitude until molten metal is no longer expelled from the nozzle channel out of the print head, wherein the amplitude at which molten metal is still expelled from the nozzle channel out of the print head, but immediately before molten metal is no longer expelled from the nozzle chamber out of the print head, is defined as the limit amplitude,
  E) repeating process step D) n times in succession, wherein, in each of then repetitions of process step D), the limit amplitude is determined,
  F) concluding the method for starting up a nozzle channel as soon as the determined limit amplitudes are all equal to or smaller than a defined limit amplitude in n+1 repetitions of process step D).

2. The method according to claim 1, wherein, in-between process steps B) and C), in a process step B1), the piston tip is moved back and forth inside the nozzle chamber, wherein the amplitude of this movement is larger than the starting amplitude by at least the factor of 10.

3. The method according to claim 2, wherein, in a case in which no molten metal is expelled after a predetermined dwell time in process step C), the process step B1) is repeated.

4. The method according to claim 1, wherein, in-between process steps C) and D), a process step C1) is performed in which the overpressure inside the crucible is reduced.

5. The method according to claim 4, wherein, in process step E), the n repetitions of process step D) are performed at the overpressure inside the crucible reduced after process step C1), and/or the piston tip is accelerated at a higher rate during its back and forth movement in process step C) than in process step D) and/or than in an operating mode in which the print head expels molten metal in drops to form a component.

6. The method according to claim 1, wherein, in a case in which no molten metal is expelled from the nozzle channel out of the print head while the piston tip is moving in process step D), a process step C2) is performed, wherein process step C2) corresponds to process step C), and process step D) is repeated after process step C2).

7. The method according to claim 1, wherein, in process step D), the movement of the piston tip is performed at a starting up frequency which amounts to 10% of the filling frequency of process step C) at maximum.

8. The method according to claim 1, wherein, in process step D), during the gradual reduction of the amplitude of the movement of the piston tip, the starting amplitude is started with, and then the amplitude is progressively reduced by a difference amplitude, wherein, after each subtraction of the difference amplitude from the current amplitude, the movement of the piston tip is continued for a period of time or for a number of movements before the amplitude is once again reduced by the difference amplitude, wherein, during the period of time or during the number of movements at a constant amplitude, it is determined whether molten metal is expelled from the nozzle channel out of the print head.

9. The method according to claim 1, wherein, after the conclusion of process step F), the print head is transferred into an operating mode in which the print head expels molten metal in drops to form a component, wherein this expulsion of molten metal in drops takes place at a standard frequency and at an amplitude which is equal to or larger than the limit amplitude, and/or
the method, is performed in an at least partly automated manner, wherein a control unit controls the process steps, and the completion of the method is determined by the control unit, and an associated notification is output to the operator of the control unit.

10. The method according to claim 1, wherein the amplitude of the movement of the piston tip in process steps C) and D) as well as in the operating mode in which the print head expels molten metal in drops to form a component is generated by a work amount provided by a control unit and acting in the actuator, wherein a work receiving element is provided which is designed to receive a partial amount of work, and the work receiving element receives part the work amount provided by the control unit in the operating mode, wherein only the remaining part of the work amount is converted by the actuator in the operating mode.

11. The method according to claim 1, wherein an expulsion detection device is used which determines whether molten metal is expelled from the nozzle channel out of the print head.

12. The method according to claim 1, wherein the actuator comprises at least one piezo element which is coupled to the piston, wherein the main expansion direction of the piezo element is directed parallel to the longitudinal axis of the piston, the control unit controls the expansion of the piezo element and thus the back and forth movement of the piston tip coupled to the piezo element, wherein the backward movement of the piston is, at least partly, performed by means of a spring force, wherein the work amount transferred to the piezo element by the control unit in the form of an electric charge is correlated to the amplitude of the piston tip and/or, in process step D), the starting amplitude is generated by a starting charge which is supplied to the actuator including a piezo element by the control unit, and, during the gradual reduction of the amplitude, the charge supplied to the actuator is gradually reduced.

13. The method according to claim 1, wherein the actuator comprises a moving device which moves the piezo element) including the piston coupled thereto relative to the nozzle in a direction parallel to the longitudinal direction of the piston in process step B1), wherein the moving device is designed to generate an amplitude which is larger than the maximum amplitude of the expansion of the piezo element by at least the factor of ten.

14. The method according to claim 1, wherein the work amount provided by the control unit for moving the piston tip is provided in the form of an electric charge which is at least partly converted in the piezo element of the actuator, and the work receiving element is formed by an electric capacitor which is connectable in parallel to the piezo element as required, wherein the work receiving element is not connected in parallel to the piezo element in process steps C) and D), and wherein the work receiving element is connected in parallel to the piezo element in the operating mode to receive a partial amount of work of the work amount provided by the control unit in the form of an electric charge.

15. A print head for processing liquid molten metal, comprising:
a crucible for accommodating a metal to be printed,
a heating device for melting the metal,
a nozzle connected to the crucible and including a nozzle chamber and a nozzle channel extending along an expulsion direction, wherein the nozzle chamber and the nozzle channel merge into each other,
an actuator including a piston having a piston tip introducible into the nozzle chamber, wherein the actuator is configured to linearly move the piston back and forth, in a direction parallel to the expulsion direction,
a control unit which controls the actuator,
wherein the control unit is configured to perform the method according to claim 1.

* * * * *